United States Patent
Nevin

(10) Patent No.: US 8,764,873 B2
(45) Date of Patent: Jul. 1, 2014

(54) NUTRIENT YIELDING BIO-RENEWABLE CONTROLLED RELEASE FERTILIZER COATINGS

(76) Inventor: James E. Nevin, Lake Worth, FL (US)

( * ) Notice: Subject to any disclaimer, the term of this patent is extended or adjusted under 35 U.S.C. 154(b) by 0 days.

(21) Appl. No.: 13/514,361

(22) PCT Filed: Dec. 7, 2010

(86) PCT No.: PCT/US2010/059267
§ 371 (c)(1),
(2), (4) Date: Jul. 13, 2012

(87) PCT Pub. No.: WO2011/071909
PCT Pub. Date: Jun. 16, 2011

(65) Prior Publication Data
US 2012/0272700 A1  Nov. 1, 2012

Related U.S. Application Data

(60) Provisional application No. 61/283,655, filed on Dec. 7, 2009.

(51) Int. Cl.
C05F 3/00 (2006.01)
C05F 11/00 (2006.01)
C05C 9/00 (2006.01)
C05C 1/00 (2006.01)
C05B 7/00 (2006.01)
C05B 17/00 (2006.01)
C05C 5/00 (2006.01)
C05C 5/04 (2006.01)
C05D 1/00 (2006.01)
C05D 9/00 (2006.01)

(52) U.S. Cl.
USPC .............. 71/15; 71/21; 71/28; 71/29; 71/30; 71/34; 71/35; 71/48; 71/49; 71/50; 71/53; 71/58; 71/59; 71/60; 71/61; 71/63; 71/64.07

(58) Field of Classification Search
USPC .............................................. 71/11–63, 64.07
See application file for complete search history.

(56) References Cited

U.S. PATENT DOCUMENTS 4,587,022 A   5/1986 Shimizu et al.
5,478,375 A  12/1995 Hudson
(Continued)

FOREIGN PATENT DOCUMENTS

GB   2272695 A   5/1994
JP   4065379 A   3/1992

OTHER PUBLICATIONS

Database WPI, Week 199215, Thomson Scientific, London, GB; AN 1992-120496, XP002625383.

*Primary Examiner* — Wayne Langel
(74) *Attorney, Agent, or Firm* — Renner Kenner Greive Bobak Taylor & Weber

(57) ABSTRACT

Animal waste is processed to form a biomaterial that is employed as a coating layer for typical fertilizer particles. The biomaterial coating layer can be used neat or with additives and serves to do one or more or any combination of the following: (a) impart a slow or controlled release property to the fertilizer, (b) prevent or reduce the tendency of the fertilizer particles to cake together, or (c) prevent or reduce the tendency of the fertilizer particles to create dust. The biomaterial coating layer can also release nutrients when used as part of a fertilizer composition.

19 Claims, 1 Drawing Sheet

(56) References Cited

U.S. PATENT DOCUMENTS

| | | | |
|---|---|---|---|
| 6,254,654 B1* | 7/2001 | Van Barneveld | 71/8 |
| 2002/0121117 A1* | 9/2002 | Hartmann et al. | 71/55 |
| 2004/0016275 A1* | 1/2004 | Hartmann et al. | 71/55 |
| 2004/0023809 A1* | 2/2004 | Wertz et al. | 504/360 |
| 2008/0016765 A1* | 1/2008 | Hartmann et al. | 47/58.1 SC |
| 2009/0031616 A1* | 2/2009 | Agblevor | 44/307 |
| 2011/0239655 A1* | 10/2011 | Carin et al. | 60/772 |

* cited by examiner

NUTRIENT YIELDING BIO-RENEWABLE CONTROLLED RELEASE FERTILIZER COATINGS

CROSS-REFERENCE TO RELATED APPLICATION

This application is the National Stage of International Application No. PCT/US2010/059267 filed on Dec. 7, 2010, which claims the benefit of U.S. Provisional Patent Application 61/283,655, filed Dec. 7, 2009.

FIELD OF THE INVENTION

This invention relates to a biologically derived resinous material that is herein termed a "biomaterial." In particular embodiments, this invention relates to a biomaterial that is derived, in part, from animal waste. In specific embodiments, the biomaterial is employed as a coating applied to fertilizer particles. More particularly, this invention relates to biomaterial coatings that are themselves nutrient yielding and are obtained in whole or in part from biologically renewable resources. In some instances, the coatings serve to control the release of the fertilizer particles into the environment; in other instances, the coating reduces caking during storage and transport and/or reduces the formation of dust on storage; and, in other instances, the coating can perform any one or any combination of all of the aforementioned functions.

BACKGROUND OF THE INVENTION

The disposal of animal waste has become a very important issue in intensive animal farming. The excreta of various intensively farmed animals, though rich in nutrients, is potentially polluting to the environment. For example, nitrogen and phosphorous compounds from cow, horse and swine manure can contaminate surface water and can even leach into groundwater, and ammonia and methane gas given off from stored manure or slurry can cause respiratory distress to people and animals in the local vicinity. As a result, there is a drive to put animal waste to beneficial uses, to reduce the amount disposed of and/or stored and thereby reduce the negative impact on the environment. Although, animal wastes are currently employed in the creation of organic fertilizers, this use does not eliminate environmental impact because the waste is still often exposed to the environment as the organic fertilizers are created, thus still contributing to surface and ground water contamination.

Animal wastes have also being employed in the creation of biogas. Biogas digesters and lagoons use anaerobic bacteria to digest organic material in the absence of oxygen and produce biogas (methane) as a waste product. Biogas can be used for heating, cooking and operating internal combustion engines, and can be converted into electricity. But methane is a greenhouse gas, and such gases are currently blamed for all sorts of ills, particularly an alleged warming of the global temperature, with allegedly potentially catastrophic consequences. Additionally, the start-up costs for implementing biogas generators and gas cleaning apparatus are quite large, making it financially difficult to implement this animal waste disposal option.

There is thus a need in the art for developing additional beneficial uses for animal waste. Not only would this put a very readily renewable resource to use, but it would also help to eliminate such waste as a source of pollution. Because animal wastes have been well-received in fertilizer applications, this invention seeks to incorporate the use of animal waste as coatings in the current fertilizer offerings. This incorporation also advances the art by freeing up the common coating components, such as petroleum-based hydrocarbon matter, for use in other applications. Because fertilizers are a focus of this invention, some background of the fertilizer industry follows.

Chemical compounds and mixtures of chemical compounds have been used for hundreds of years for the purpose of modifying the natural chemical composition of soils in order to enhance the growth and health of plant life. For centuries these products were obtained from natural materials and waste materials that were readily available and relatively easy to harvest. For example, people have used animal manure such as guano, cow manure and horse manure as a fertilizer for field crops, primarily for their phosphorous and nitrogen content. As technology advanced, people employed more sophisticated and efficient means for adding nutrients to the soil.

Justus von Liebig developed the first commercial nitrogen-based fertilizer (ammonia) back in the early 19th century in Germany, and, since that time, chemical compounds such as ammonium nitrate, urea, ammonium sulfate, potassium chloride and various phosphate compositions have been synthetically manufactured for use in liquid and solid fertilizer formulations. The implementation of these advances in fertilizer technology has resulted in large increases in crop yields for agricultural applications and an improvement in the appearance and health of turf grass and ornamental plants.

Due to the growing world population, the limited availability of productive crop land, and the alternative uses for which some types of crops are employed, such as for fuel and other performance chemicals, there is a need to improve the growth rate and yield of crops per planted acre. In the pursuit of increased crop yield, farmers and researchers in the agricultural industry have turned to the manufactured chemicals industry for advances in fertilizers, pesticides and herbicides that will improve plant health and growth rate and correspondingly the plant density and food yield per acre of farm land.

Due to the added cost associated with the use of synthetic fertilizers it became necessary in some instances to prevent the sudden dissolution of the solid nutrient particles by applying a surface coating to them in a separate manufacturing process. These coatings, often referred to as controlled release or slow release coatings, allow for the nutrient compounds to be released into the surrounding growth medium over a designed period of time. Not only does the controlled release serve to extend the useful life of potentially expensive fertilizer chemicals, it also prevents the fertilizer from being released in an amount that could be toxic to plant life or otherwise hazardous to surrounding ecosystems. Indeed, in some regions of the world, most notably in Western Europe, there are stringent regulations in place that restrict the amount of nitrogen and phosphorous that can be applied to crops. Thus, controlled release technology can be essential in some applications.

A significant number of controlled release fertilizer coatings have been proposed and commercially developed. These include the processes of sulfur coating urea particles (e.g., U.S. Pat. Nos. 3,295,950, 5,300,135), 4,711,699, 4,969,947, and epoxy coating fertilizer compositions (e.g., U.S. Pat. Nos. 3,264,088 and 5,698,002).

One general drawback to all such coatings is that the components with which they are made are not typically bio-renewable, where "bio-renewable" is to be understood as deriving from naturally recurring material streams. The components must instead be purchased from either non-renewable sources or from sources less easily replaced as compared to animal waste sources, which are constantly being produced in agriculture. The animal wastes that are the focus of this invention are not only readily renewable, but they have inherent nutrient content useful for fertilizing, as known from the use of such materials in the creation of organic fertilizers, and, thus, the art would benefit from the use of animal wastes as coatings for fertilizers, and the present disclosure serves to teach the same.

The use of biologically derived materials as adjuvants in the production of controlled release fertilizers has been disclosed in U.S. Pat. No. 5,478,375. One of the basic components of the materials claimed (tallow) requires the destruction of livestock in order to obtain the precursor to the product. The other (soybeans) requires the harvest of a material that has a very important food value. None of these routes to producing controlled release fertilizer particles takes advantage of a waste stream of material that would otherwise be considered at best an environmental nuisance and at worst a significant contributor to serious ecological problems.

Many fertilizers, particularly granular fertilizers have a tendency to stick together during transport and storage. This phenomenon, called "caking" in the vernacular of the fertilizer industry, is brought about by the natural tendency of the granules to combine with one another based on their chemical and physical compatibilities including their tendency to be hygroscopic (tending to absorb moisture, even from the atmosphere). There are two widely accepted mechanisms explaining caking. The first is called crystal bridging, wherein, in the presence of moisture, molecules from one granule combine with the molecules from adjacent contacting molecules, forming bridges of the molecular crystals. The second mechanism for caking is called capillary adhesion, wherein the hydraulic forces brought into play by virtue of the absorption of water into the porosity of the granules creates tenacious bonding forces. The tendency for fertilizer granules to cake and the degree of caking is dependent upon the type of fertilizer, the geometric shape of the granules, the environmental conditions during production, storage and transport, the pressure applied during storage, as well as other variables. Some of the common types of fertilizers that cake during storage and transport include urea, ammonium phosphate, ammonium nitrate, calcium nitrate, ammonium sulfate, potash, super phosphates and complex fertilizers such as NPK's (nitrogen-phosphorous-potassium fertilizers).

Granular fertilizers such as ammonium phosphate, potash, super phosphates and NPK's have another disadvantage, that of generating dust during manufacture, handling, transport and storage by the abrasive effects of these resultant actions on the granules or by the decomposition of the granule itself due to cohesive losses and in some cases, most notably with ammonium nitrate from volumetric inconsistencies due to crystal phase changes.

Chemical additives have been used for decades in the treatment of granule fertilizers for both anticaking and dust control applications. In the case of anticaking agents, finely sized dispersed particles of talc, and various clay minerals such as attapulgite and diatomaceous earth have been used as a surface dressing. These fine particles reduce the intimate contact between the fertilizer granules and also serve to absorb residual moisture that can also contribute to the caking phenomenon. Smith addresses the use of attapulgite clay as an anticaking agent in U.S. Pat. No. 3,041,159 and again in U.S. Pat. No. 3,125,434. Similarly, Sutton in U.S. Pat. No. 3,886,641 discloses the use of calcined Kaolin as an anticaking agent for granular fertilizers.

Waxes, oils and other hydrophobic compounds in some cases modified by the addition of surface active chemicals such as fatty amine, fatty acids and alkyl sulfonates have also been widely used as anticaking coatings, and, because many of the same phenomenon that cause caking also play a part in the generation of dust, many of these compounds are used for preventing dust generation as well. In many cases, however; dust control is an independent issue particularly in production and storage and must be dealt with as such. In these cases the granules are typically coated with very inexpensive compounds which serve the basic purpose of absorbing fugitive dust particles on to the treated surface of the granules. In these cases inexpensive, readily available materials such as mineral oil, vegetable oil, petrolatum, waste oils and various pitches derived from the processing of pine trees used in making paper and wood products and combinations thereof can be used without the need of any active chemicals that would increase the cost of the formula. The drawback of using these products is that they do not add any nutrient value to the fertilizer; their use in anti-dust and/or anti-caking applications prevents their use in other potentially more useful applications such as lubricants and food stuffs; and their use can be harmful to the environment.

In each of the above mentioned cases of prior art formulations, the addition of the prior art coating agents reduces the overall concentration of active plant nutrient in the fertilizer as a whole, thereby diluting its desired effect on the plant growth for which it was intended. The art would therefore benefit from a fertilizer coating that is itself nutrient yielding, biologically renewable and waste reducing whether the coating is provided to affect a slow release of the main fertilizer components or is provided for anti-caking properties or is provided for dust control or for any combination of those foregoing properties.

SUMMARY OF THE INVENTION

It is an object of the present invention to provide a biomaterial composition that is derived from biologically renewable sources, which, in particular embodiments are animal waste sources.

It is another object to provide a method for producing the biomaterial composition from raw animal waste.

It is another object to provide an improvement to solid fertilizer particles by the inclusion of a coating layer derived from the biomaterial composition, the coating layer providing one or more of the following properties: imparting slow or controlled release properties to the fertilizer, preventing or reducing the tendency of the fertilizer particles to cake together, or preventing or reducing the tendency of the fertilizer particles to evolve dust.

A further objective of this invention is to provide a coating layer, as above, that is nutrient yielding and therefore is itself beneficial to the plant growth process.

In coatings imparting slow or controlled release properties, it is yet a further object to modify the biomaterial with polymers and other chemical additives to reduce the hydrophilic nature of the biomaterial and effect changes in its physical and chemical properties as necessary to achieve the desired results of the coating.

Other objects and further scope of applicability of the present invention will become apparent from the detail of the description provided in this document. The detailed descriptions provided while indicating preferred embodiments of the invention are for illustrative purposes only, since modifications within the scope and spirit of the invention will become apparent therefrom.

In one embodiment, this invention provides a fertilizer composition comprising: a plant nutrient core containing at least one water soluble plant nutrient; and a biomaterial coating layer including a biomaterial derived from animal waste.

DETAILED DESCRIPTION OF ILLUSTRATIVE EMBODIMENTS

Figure 1:
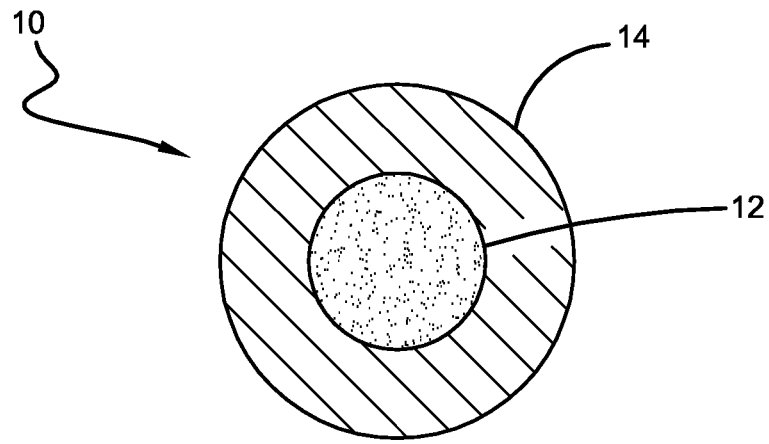
FIG. 1 provides a cross sectional view of an embodiment of a two-layer fertilizer composition of this invention.

In accordance with the present invention, beneficial use is made of animal waste by converting it into what is broadly referred to herein as a "biomaterial," the name indicating that it is a material that comes from a biological source. This biomaterial is employed as a coating. In particular embodiments, the biomaterial is employed in a biomaterial coating layer to coat plant nutrient core components, which are generally to be understood as any component that serves as a plant nutrient, whether currently employed in that manner (as, for example, urea, ammonium sulfate, potassium sulfate, ammonium nitrate, di-ammonium phosphate or complex fertilizers containing nitrogen, phosphorous and potassium) or hereinafter discovered or developed for such purposes. In some embodiments, the biomaterial is further modified with one or more of the following: polymers, compatibilizing agents, other resins, extenders, modifiers or fillers.

The biomaterial is derived from animal waste, with the understanding that "animal waste" as used herein includes not only the typically understood animal excreta but also the bodies of the animals themselves. That is, "animal waste" herein may include dead animal bodies and portions thereof. In accordance with this invention, the biomaterial may be produced from animal excreta, from animal bodies or both. Because animal excreta can be employed without destruction of the host animal and further because the disposal of excreta can cause significant environmental impact, it is preferable to use only animal excreta and other waste materials from the host animals particularly hair and other such fugitive substances. However, animal farming and meat production can result in a number of dead animal bodies (whole or body parts), and this invention can provide a way in which to beneficially dispose of such bodies, converting them to a biomaterial.

Thus, in particular embodiments, the animal waste is animal excreta, particularly manure, which should be understood as being the combined feces, urine and added products such as water, wasted feed, hair and bedding for the animals, which added products are typically very difficult to separate from the urine/feces excreta. The manure may come from any animal source, even human. Pig, chicken, cow, lamb, goat, and horse manure are likely to be the best source for producing the biomaterial because a great number of these animals are often gathered together in one place for animal farming, thus yielding a significant amount of manure in one place for easier collection. Pig manure is of particular interest because pigs tend to produce a large amount of manure, as compared to other animals.

The manure can be liquid slurry, a semi-solid, or a dry form, though, if it is obtained in a dry form, is preferably treated to be a slurry or semi-slurry so that it can be processed in a chemical converted as taught below, because liquid and slurry forms are easier to work with and to incorporate components. Manure usually has the characteristics of a liquid when it has 15% solids or less, but might be found to have the characteristics of a solid at 20% solids or greater. Dry manure can be broken up and mixed with water or other extenders and/or fillers to create the desired slurry and percent solids content for the process herein.

In this invention, the biomaterial is produced by a thermochemical (i.e., pyrolysis) reaction or hydro-thermal conversion process whereby a combination of high temperature and pressure in the absence of oxygen produces smaller hydrocarbon molecules from the larger ones found in animal waste. The animal waste is processed in the form of slurry having a solids content of less than 20%, in other embodiments, less that 15%, in yet other embodiments, less than 10%, and in other embodiments, 5% or less. The collected liquid slurry waste is processed by first pumping the matter through a particle size reduction apparatus so that it can more readily be pumped through the reactor tubing or piping of the converter. In some embodiments a 200 mesh screen is used. The animal waste is processed in the absence of oxygen, at a temperature of from 100 to 400° C., and the pressure is maintained sufficiently high to ensure that the slurry, which is comprised of a significant amount of water, does not boil.

In some embodiments of this process, the converter is pressurized to a minimum pressure of 200 psi (pounds per square inch), in other embodiments, a minimum pressure of 400 psi, in other embodiments, a minimum pressure of about 800 psi, in other embodiments a minimum pressure of 1200 psi, in yet other embodiments a minimum pressure of 1600 psi, and in yet other embodiments a minimum pressure of 1800 psi. In some embodiments, at these pressures, the converter is heated to a temperature between 100 and 400° C., in other embodiments, from 150 to 375° C., and in other embodiment, from 200 to 350° C. In particular embodiments the temperature is maintained near 300° C. Notably, the processing is carried out in the absence of free oxygen, to prevent the oxidation of chemical compounds. In particular processes, the converter is pressurized to a pressure of from 1600 psi to 1800 psi and is heated to a temperature between 250 and 350° C., in the absence of free oxygen, to prevent the oxidation of chemical compounds. In the process, after about 10 to 100 minutes at the above processing conditions, it is believed that the high molecular weight compounds of the animal waste are cleaved, thereby forming smaller hydrocarbon molecules which are more useful in the present invention. The product resulting from this process is the "biomaterial" of this invention. Processing parameters and equipment are disclosed in Ocfemia, K. S., Zhang, Y. H., and Funk, T. (2006), Hydrothermal processing of Swine Manure into Oil Using a Continuous Reactor System: Development and Testing, Transactions of ASAE 49(2), 533-541 and Ocfemia, K. S., Zhang, Y. H., and Funk, T. (2006), Hydrothermal Processing of Swine Manure to Oil Using a Continuous Reactor System-Effects of Operating Parameters on Oil Yield and Quality, Transactions of ASAE 49(6), 1897-1904, both of which are incorporated herein by reference in their entirety. Currently, acceptable biomaterial is produced by Advanced BioRefinery Inc. (Ottawa, Canada) and Innoventor Inc. (St. Louis, Mo., USA). Regarding Innoventor's work, see U.S. Pat. No. 7,105, 088, incorporated herein by reference in its entirety.

Following the conversion process, the liquid slurry biomaterial is pumped to a filtration processor where the solids are concentrated prior to being dried. The biomaterial is dried to facilitate storage and transportation, particularly with regard to volume and weight. The biomaterial is preferably dried to have a minimum solids content of from 95 to 100%. At 25° C.

the dried product is a solid resinous substance similar in consistency to asphalt and can be made liquid by heating to higher temperatures.

The biomaterial of this invention is a substance rich in polar organic compounds, including nitrogen and phosphorous containing compounds, hydrocarbons and inorganic minerals. The resulting resin can be used neat as a biomaterial coating layer as taught herein, particularly when dust control is the main function to be served by the coating layer, but, in some applications, the biomaterial coating layer may include the biomaterial and additional polymers, compatibilizing agents, other resins, extenders, modifiers and fillers. These additional components, when desired for particular end uses, are incorporated into the biomaterial by simple addition and mixing or by in situ addition during the process of applying the biomaterial to the fertilizer.

The biomaterial is somewhat hydrophilic, having emanated from a biologically hydro-systemic process, and, as such, may be found to break down and release too quickly in water-based environments, such as that encountered by fertilizers, particularly by contact with dew, rain water, feed water and the like. Thus, when employed for the purpose of acting as a fertilizer coating the biomaterial will benefit from the incorporation of polymers or other additives such as stearic acid, tallow amines, salts thereof and various waxes. As generally known, such polymer and other additions can make the biomaterial more robust, improving its moisture resistance to make the biomaterial more hydrophobic and thus reduce its rate of decomposition and dissolution when contacted by water. These additives may also serve to impart greater mechanical strength to the resin thereby improving its physical attributes in given applications, such as by improving the abrasion resistance of the coating. Non-limiting examples of useful polymer additions include polymers, copolymers and terpolymers containing monomers of polyvinyl chloride, styrene, ethylene, butadiene, vinyl acetate, isoprene, maleic anhydride, acrylic esters and acrylonitrile. As mentioned, other additives used for these purposes can include stearic acid, tallow amines, salts thereof and various waxes.

Particularly useful polymers in this regard include the copolymers of ethylene and vinyl acetate that are known as EVA's and are available from a variety of suppliers worldwide including DuPont, Arkema and Repsol. Particularly effective EVA's are those that are high in vinyl acetate content due to their compatibility with a broader range of polar resins and their excellent adhesion to non-porous surfaces. The melt flow requirement of the additive copolymer will depend upon the particular nutrient being coated by the composition of the present invention. For example, low melt temperature fertilizers such as urea will require the use of a biomaterial coating composition that is able to flow at lower temperatures thereby requiring a high melt flow index. Conversely, higher melt point fertilizers such as ammonium sulfate can be coated with biomaterial coating compositions containing low melt flow polymers since the process temperature can be elevated to the point of acceptable flow for coating the particles.

As generally practiced in the art of current fertilizer coatings, the biomaterial coatings of this invention may include useful compatibilizing agents that serve to chemically or physically compatibilize the biomaterial coating with a particular fertilizer it is to coat and/or with additional additives being added to the biomaterial. Thus, the compatibilizing agents may include surfactants that serve to chemically compatibilize and/or permit the biomaterial to interact with the fertilizer or coatings on the fertilizer or other additives to the biomaterial coating. For example, if waxes are included in the biomaterial coating, a surfactant may be desired to help the biomaterial mix with the wax because the biomaterial includes a polar constituency that may not otherwise be readily compatible with waxes (note, wax additions are mentioned below). Non-limiting examples of useful surfactants include hydrocarbons with one or more amine functionalities; hydrocarbons with one or more carboxylic acid functionalities; mixtures of hydrocarbons containing one or more amine functionalities with hydrocarbons containing one or more carboxylic acid functionalities; and hydrocarbons with one or more sulfonate moieties. Non-limiting examples of such surfactants include tallow and hydrogenated tallow amine, tallow diamine, stearic acid, oleic acid, tall oil fatty acids and rosin acids.

Due to biomaterial's primarily hydrocarbon content, the physical and chemical properties of the biomaterial are readily capable of modification with resinous hydrocarbon compounds. Resins with functional polar moieties are preferred due to their higher level of solubility in the biomaterial and compatibility with polymer additives. Non-limiting examples of useful resin additives include tall oil pitch, rosin esters, hydrocarbon resins.

Since the biomaterial can emanate from animal waste streams it will likely contain inherent objectionable odors that could otherwise prohibit or limit its use in some applications. It is therefore desirable to add odor modifiers that reduce or eliminate the objectionable odors by means of absorption, masking or chemical modification. Non-limiting examples of useful odor modifiers include activated carbon, vanilla, benzaldehyde, acetophenone, methyl salicylate, d'limonene and various perfumes.

In order to modify the viscosity or flowability of the biomaterial in its various applications, it may be necessary to extend it by the addition of an extender or viscosity modifier in the form of solvents and other diluents. Such viscosity modifiers may also serve to enhance other desirable properties of the biomaterial such as compatibility with and between other additives. Non limiting examples of extenders and viscosity modifiers include tallow, glycerin, mineral oils, vegetable oils and hydrocarbon wax. Particularly useful waxes and oils are those that contain polar moieties such as alcohol, ether or ester groups.

Since the biomaterial is somewhat thermoplastic in nature it may be necessary to increase its resistance to flow along with its ability to withstand deformation forces in certain applications. Such properties can be enhanced by using finely ground mineral and synthetic fillers and or natural and synthetic fibers. Non limiting examples of useful fillers include talc, diatomaceous earth calcium carbonate, silica, cellulose, cellulose fibers and synthetic fibers.

A biomaterial coating layer in accordance with this invention may be 100% biomaterial, particularly where it is being employed mainly for dust control. In other embodiments, a biomaterial coating layer may include from 1 to 99% by weight biomaterial and from 99% to 1% of the various additions disclosed herein. In other embodiments, the biomaterial coating layer include from 5 to 95% by weight biomaterial and from 95 to 5% by weight of the various additions. In yet other embodiments, the biomaterial coating layer includes from 10 to 90% by weight biomaterial and from 90 to 10% by weight of the various additions. In yet other embodiments, the biomaterial coating layer includes from 15 to 85% by weight biomaterial and from 85 to 15% by weight of the various additions. In yet other embodiments, the biomaterial coating layer includes from 20 to 80% by weight biomaterial and from 80 to 20% by weight of the various additions.

If polymers additions are employed, the biomaterial coating layer may include from 0.1 to 50% by weight additive polymer. In other embodiments, the biomaterial coating layer may include from 3 to 35% by weight additive polymer, in yet other embodiments, from 5 to 25% additive polymer, and in yet other embodiments, from 10 to 25% additive polymer.

If compatibilizing agents are employed, the biomaterial coating layer may include from 0.1 to 25% by weight compatibilizing agents. In other embodiments, the biomaterial coating layer may include from 1.0 to 20% by weight compatibilizing agents, and in yet other embodiments, from 2 to 10% by weight compatibilizing agents.

If resin additions are employed the biomaterial coating layer may include from 0.25 to 50% by weight resins. In other embodiments, the biomaterial coating layer may include from 0.5 to 40% by weight resins, and in yet other embodiments, from 5 to 25% by weight resins.

If extenders are employed, the biomaterial coating layer may include from 0.1 to 50% by weight extenders. In other embodiments, the biomaterial coating layer may include from 0.5 to 40% by weight extenders, in yet other embodiments from 5 to 25, and in yet other embodiments from 10 to 15% extenders.

If odor modifiers are employed, the biomaterial coating layer may include from 0.001 to 10% by weight modifiers. In other embodiments, the biomaterial coating layer may include from to 0.05 to 5% by weight odor modifiers, and in yet other embodiments from 0.01 to 1% by weight odor modifiers.

If fillers are employed, the biomaterial coating layer may include from 0.1 to 50% by weight fillers. In other embodiments, the biomaterial coating layer may include from 0.5 to 25% by weight filler, and in yet other embodiments from 1 to 15% by weight fillers.

In accordance with an embodiment of this invention, the biomaterial is employed as a coating on a plant nutrient core component, the coating serving to do one or more or any combination of the following: (a) impart a slow or controlled release property to the fertilizer, (b) prevent or reduce the tendency of the fertilizer particles to cake together, or (c) prevent or reduce the tendency of the fertilizer particles to create dust. In this embodiment, the biomaterial may be applied directly to a plant nutrient core component, thus creating a two-layer fertilizer composition 10, as shown in FIG. 1, with a plant nutrient core 12 and biomaterial coating layer 14 coating the core 12.

The plant nutrient core component may be selected from virtually any component that serves as a nutrient to a plant, whether a currently-employed fertilizer or a hereinafter discovered or developed fertilizer or other nutrient component. In particular embodiments the plant nutrient core component is selected from urea, ammonium sulfate, ammonium nitrate, ammonium sulfate-nitrate, calcium nitrate, calcium ammonium nitrate, phosphorous compounds such as ammonium phosphate, mono- and di-ammonium phosphate, and triple super phosphate, and potassium compounds such as potassium chloride and potassium sulfate, often referred to as potash. Combinations of the foregoing may also be employed to produce complex plant nutrient cores, and, as is generally known, other common fertilizer elements such as iron, manganese and magnesium may be included in minor amounts. The plant nutrient core component and the multitude of specific compounds and components that can be employed as the plant nutrient core component are well understood by those of ordinary skill in the art. Thus, this invention focuses on the beneficial use of the biomaterial.

In particular two-layer embodiments such as those in FIG. 1, the fertilizer composition 10 is made up of from 50 to 99.9% by weight plant nutrient core and from 50 to 0.1% by weight biomaterial coating layer. In other two-layer embodiments, the fertilizer composition 10 includes from 90 to 99% by weight plant nutrient core and from 10 to 1% by weight biomaterial coating layer. In yet other two-layer embodiments, the fertilizer composition 10 includes from 92 to 97% by weight plant nutrient core and from 8 to 3% by weight biomaterial coating layer.

In the embodiment of FIG. 1, the plant nutrient core 12 is formed as it is commonly formed in the prior art, as, again, it is not the focus of this invention to be concerned with the production of these plant nutrient core compounds, which are generally available. Although this invention is not to be limited to a particular coating process, the plant nutrient core 12 may be covered with the biomaterial coating layer 14 by spraying, dripping or streaming the biomaterial onto a rolling bed of plant nutrient core granules carried in a coating drum or similar such mixing device as commonly used in the industry. The biomaterial may also be sprayed onto the plant nutrient core while the core particles are carried in a fluidized bed.

Notably, as already mentioned, because the biomaterial is derived from animal waste, it includes polar organic compounds, including nitrogen and phosphorous containing compounds, hydrocarbons and inorganic minerals, and it has been unexpectedly found that the biomaterial will release nutrients when used as part of a fertilizer composition. Indeed, improved plant growth has been observed when employing compositions of this invention on an inert core, and comparing plant growth using just the inert core versus plant growth using an inert core coated with a biomaterial coating layer of this invention. The nutrients contained in the biomaterial may also be beneficially time released from the biomaterial coating layer.

Figure 2:
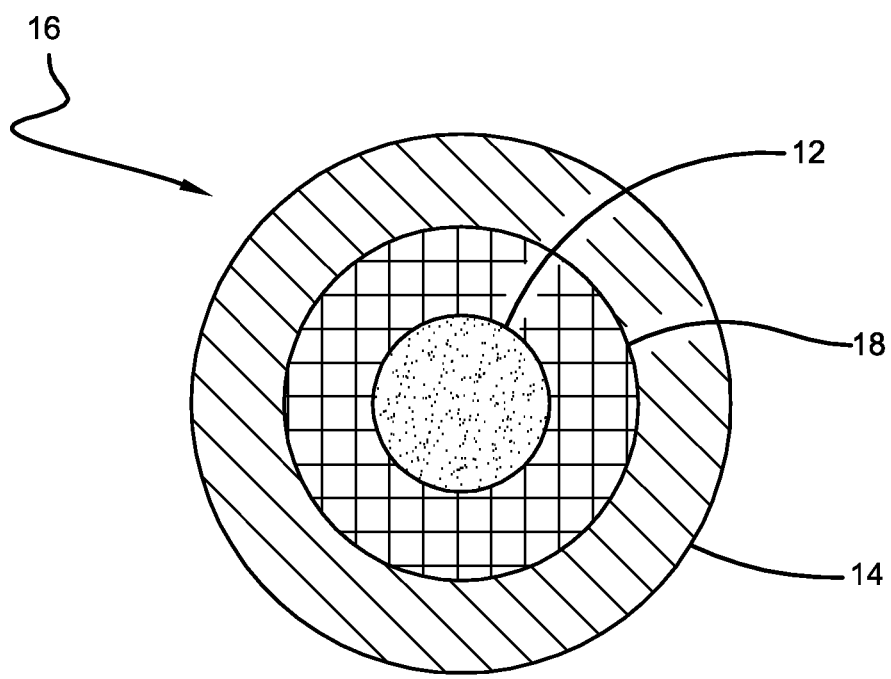
FIG. 2 provides a cross sectional view of an embodiment of a multi-layer fertilizer composition of this invention.

In other embodiments as shown in FIG. 2, the biomaterial may be applied in addition to typical fertilizer coating layers, such that a multi-layer fertilizer composition 16, would be created, having a plant nutrient core 12, at least one typical fertilizer coating layer 18, and a biomaterial coating layer 14. In this embodiment, the biomaterial coating layer is included to do one or more or any combination of the following: (a) impart a slow or controlled release property to the fertilizer, (b) prevent or reduce the tendency of the fertilizer particles to cake together (c) prevent or reduce the tendency of the fertilizer particles to create dust, and (d) impart abrasion resistance or void filling enhancement to (i.e., fill voids present in) the primary coating of the fertilizer.

In still further embodiments, the biomaterial may be applied as a first coating layer or layers and subsequently over-coated with a secondary coating layer comprised of a different substance and even a tertiary layer and so on as necessary to create the desired end result. For example, the biomaterial coating layer 14 and the fertilizer coating layer 18 of the embodiment of FIG. 2 could be switched and/or additional coating layers could be employed.

The plant nutrient core may be selected as disclosed above. The fertilizer coating layer may be selected from virtually any fertilizer coating whether currently employed of hereinafter discovered and developed. In particular embodiments, the fertilizer coating layer is selected from polyurethanes, epoxies, sulfur, and polyvinyl chlorides (PVC). The fertilizer coating layer and the multitude of specific compounds and components that can be employed as the fertilizer coating layer are well understood by those of ordinary skill in the art. Thus, this invention focuses on the beneficial use of the biomaterial.

In particular multi-layer embodiments such as those in FIG. 2, the fertilizer composition 10 is made up of from 50 to 99.4% by weight plant nutrient core, from 0.5 to 25% by weight fertilizer coating layer, and from 0.1 to 25% by weight biomaterial coating layer. In other multi-layer embodiments, the fertilizer composition 10 includes from 75 to 97% by weight plant nutrient core, from 2 to 15% by weight fertilizer coating layer, and from 1 to 10% by weight biomaterial. In yet other embodiments the fertilizer composition 10 is made up of from 85 to 95% by weight plant nutrient core, from 3 to 10% by weight fertilizer coating layer, and from 2 to 5% by weight biomaterial coating layer.

In the embodiment of FIG. 2, the plant nutrient core 12 is formed as it is commonly formed in the prior art, and the fertilizer coating layer 18 is applied thereto as is common in the prior art. The biomaterial coating layer 14 is applied to this fertilizer coating layer 18 by spraying, dripping or streaming the biomaterial on to a rolling bed of fertilizer-coated nutrients core granules in a coating drum or similar such mixing device as commonly used in the industry. The biomaterial may also be sprayed onto the fertilizer coating layer 18 while the fertilizer-coated nutrient core granules are carried in a fluidized bed. Alternatively, the biomaterial coating layer 14 may be applied to the plant nutrient core 12 and subsequently coated by the fertilizer coating layer 18, i.e., the layers 14 and 18 of FIG. 2 may be switched.

In an embodiment of this invention, the fertilizer coating layer 18 is a polyurethane coating consisting of at least on polyisocyanate containing no fewer than 2 N=C=O moieties and at least one polyol containing no fewer than 2 OH moieties. In yet other embodiments, the ratio of N=C=O functionality in said polyisocyanate to OH functionality in said polyol is about 1:1. In still further embodiments, the polyisocyanate and/or the polyol is mixed with a hydrocarbon wax prior to being applied to the fertilizer. In some embodiments, the polyisocyanate and the polyol components are added to a mixing vessel with the plant nutrient core and allowed to react in-situ in a coating drum at elevated temperatures to coat the plant nutrient core. In yet additional embodiments employing a polyurethane coating that is reacted in-situ as just described, the core plant nutrient is urea, and the temperature of the mixing vessel including the urea and the polyurethane reagents is maintained at between 50 and 100° C.

In an embodiment of this invention, the fertilizer coating layer 18 is an epoxy coating that consists of at least two components, one being the diglycidal ether of bis-phenol A, and the other a polyamine or polyamide or derivative thereof. In yet other embodiments, the epoxy resin contains at least 2 diglycidal ether moieties and the polyamine contains at least two N—H moieties. In further embodiments, the ratio of epoxide functionality to amine functionality is about 1:1.

In accordance with further embodiments, the diglycidal ether of bis-phenol A and the polyamine or polyamide are added separately to a mixing vessel containing the plant nutrient core and allowed to react in-situ at elevated temperatures. In still other embodiments of the in-situ coating process, chemically active diluents or extenders can be added in order to enhance reactivity and/or reduce the viscosity of the reactant monomers during the coating process. In particular non-limiting embodiments, the chemically active modifiers are polyacrylates. In yet other embodiments, the diglycidal ether of bis-phenol A and the polyamine or polyamide are premixed prior to their addition to a mixing vessel containing the core plant nutrient, and are allowed to react in-situ at elevated temperatures. In some embodiments of the in-situ coating processes, the temperature of the mixing vessel including the urea and the reactants is maintained at between 50 and 100° C.

In a separate and distinct embodiment of a two-layer fertilizer composition 10, the plant nutrient core 12 is urea, and the biomaterial coating layer 14 is derived as taught above.

In another separate and distinct embodiment of a two-layer fertilizer composition 10, the plant nutrient core 12 is ammonium sulfate, and the biomaterial coating layer 14 is derived as taught above.

In yet another separate and distinct embodiment of a two-layer fertilizer composition 10, the plant nutrient core 12 is ammonium nitrate, and the biomaterial coating layer 14 is derived as taught above.

In yet another separate and distinct embodiment of a two-layer fertilizer composition 10, the plant nutrient core 12 is ammonium sulfate-nitrate, and the biomaterial coating layer 14 is derived as taught above.

In yet another separate and distinct embodiment of a two-layer fertilizer composition 10, the plant nutrient core 12 is calcium nitrate or calcium ammonium nitrate, and the biomaterial coating layer 14 is derived as taught above.

In yet another separate and distinct embodiment of a two-layer fertilizer composition 10, the plant nutrient core 12 is ammonium phosphate or derivatives thereof including mono-ammonium phosphate, diammonium phosphate, triple super phosphate and the like, and the biomaterial coating layer 14 is derived as taught above.

In yet another separate and distinct embodiment of a two-layer fertilizer composition 10, the plant nutrient core 12 includes salts of potassium including potassium chloride and potassium sulfate (often referred to as potash), and the biomaterial coating layer 14 is derived as taught above.

In still another separate and distinct embodiment of a two-layer fertilizer composition 10, the plant nutrient core is a complex fertilizer containing more than a single nutrient composition, the complex fertilizer comprising two or more of nutrients selected from nitrogen, phosphorus, potassium, and/or micronutrients such as iron, manganese, and magnesium, and the biomaterial coating layer 14 is derived as taught above. The complex fertilizers are also known as NPK's.

In a separate and distinct embodiment of a multi-layer fertilizer composition 16, the plant nutrient core 12 is urea, the fertilizer coating layer 18 is polyurethane, and the biomaterial coating layer 14 is derived as taught above.

In another separate and distinct embodiment of a multi-layer fertilizer composition 16, the plant nutrient is urea, the fertilizer coating layer 18 is epoxy and the biomaterial coating layer 14 is derived as taught above.

In still another separate and distinct embodiment of a multi-layer fertilizer composition 16, the plant nutrient is urea, the fertilizer coating later 18 is sulfur and the biomaterial coating layer 14 is derived as taught above.

In still another separate and distinct embodiment of a multi-layer fertilizer composition 16, the plant nutrient is ammonium sulfate, the fertilizer coating layer 18 is PVC or plasticized PVC which may be modified with polyacrylates, polyurethane or epoxy resins and the biomaterial coating layer 14 is derived as taught above.

In still another separate and distinct embodiment of a multi-layer fertilizer composition 16, the plant nutrient is urea, the fertilizer coating layer 18 is sulfur followed by polyurethane and the biomaterial coating layer 14 is derived as taught above.

In still another separate and distinct embodiment of a multi-layer fertilizer composition 16, the plant nutrient core is a complex fertilizer containing any combination of two or more compounds containing nitrogen, phosphorous and potassium, as taught above plus any minor elements commonly used in fertilizer formulations such as iron, magnesium and manganese; followed by a polymer coating of epoxy or polyurethane and then the biomaterial 14 derived as taught above.

It has been found that the biomaterial coating layer provides any one of a number of beneficial properties to the two-layer and multi-layer fertilizer compositions taught herein as compared to common fertilizer compositions of the prior art, which do not contain the biomaterial coating layer. The biomaterial coating layer imparts a slow or controlled release property to the fertilizer because it has good film forming characteristics and does not break down quickly in the presence of water, as in the case of water (or rain) being applied to the two-layer or multi-layer fertilizer—this resistance to breaking down by water being improved upon by the addition of polymer additives or waxes to enhance the hydrophobic nature. The biomaterial coating layer also prevents or at least reduces the tendency of the fertilizer particles to cake together because it coats the core plant nutrient,—this resistance to caking being improved upon by the addition of compatibilizing agents such as stearic acid, which modify the biomaterial coating to provide a low friction coating that is somewhat hydrophobic. Additionally, the biomaterial coating layer prevents or at least reduces the tendency of the fertilizer particles to evolve dust by fact that it provides a good complete film, and it has been found that dust particles tend to stick to the biomaterial coating. The biomaterial coating layer also unexpectedly provides its own controlled release nutrients to the soil as it breaks down and/or dissolves and degrades.

When the two-layer or multi-layer fertilizer compositions are applied to the ground to assist with the growing of vegetation, the biomaterial coating layer also serves as a fertilizer, providing nutrients to the soil and thus the vegetation. The biomaterial coating layer is derived from animal waste, and, as such, includes various compounds that are beneficial as plant nutrients. These are believed to include nitrogen and phosphorous containing compounds, hydrocarbons and inorganic minerals.

EXPERIMENTS

Example 1

Hog waste including excrements such as swine manure and urine and shedding such as hair are collectively stored in a pit beneath a hog confinement area, such waste further including the rinse water from cleaning the areas of confinement. This waste is subjected to a number of processing steps including screening, particle size reduction, solids content control, purification, pyrolysis, fine filtration and drying to provide a biomaterial as disclosed herein above. Pyrolysis occurs for a period of time 1.5 hours at a pressure maintained around 1600 psi and a temperature range maintained around 300° C. The resulting filtered and dried biomaterial has a final moisture content of less than 5 percent, a particle size via sieve analysis of +200 mesh. Elementally, the biomaterial is comprised principally of carbon and hydrogen along with lesser amounts of sulfur, nitrogen and phosphorous.

Example 2

180 grams of biomaterial from Example 1, is heated to a temperature of 300 degrees Fahrenheit in a 600 mL insulated glass beaker. While vigorously stirring with an overhead paddle mixer at 100 rpm, 25 grams of hydrogenated tallow amine and 75 grams of ethylene vinyl acetate (Elvax 205W) are sequentially added. This composition represents a product that can be used as a sealant coating for polymer or sulfur coated fertilizers.

Example 3

95 grams of biomaterial of Example 1 is heated to a temperature of 250 degrees Fahrenheit in a 250 mL glass beaker. While moderately stirring with an overhead paddle mixer 5 grams of hydrogenated tallow amine is added to the beaker and mixed for 15 minutes. This composition represents a product that can be used as a dust control coating agent for granular fertilizers.

Example 4

220 grams of biomaterial of Example 1 is heated to a temperature of 320 degrees Fahrenheit before being loaded into a 600 mL insulated round bottom 4 neck glass reaction flask. To its four protruding necks, the flask is fitted with (1) a water cooled reflux column, (2) an overhead direct drive mixer and (3) a solid feed addition hopper and (4) a thermometer. The solid feed hopper is filled first with 25 grams of hydrogenated tallow amine and then with 105 grams of Ethylene Vinyl Acetate copolymer in bead form (Elvax 205W) having a melt flow index of 800 and a vinyl acetate content of 28. Under mild agitation the HTA is added quickly to the biologically derived resin resulting in a lower viscosity composition. Next, the EVA is gradually added to the reaction vessel until it has all dissolved and dispersed into the biologically derived resin. As the EVA is added and subsequently dispersed the resin becomes much thicker thus requiring additional mixing speed in order to adequately disperse the polymer. Stirring is continued until the composition is shown to be completely homogeneous which constitutes a time period of about 1 hour. This composition represents a slow release coating for granular fertilizers.

Example 5

500 grams of granular urea is heated to 150 degrees Fahrenheit in an 18 inch diameter by 5 inch wide rotating stainless steel drum equipped with 2 inch tall lifting flights positioned each 20 degrees of internal circumference. To the falling curtain of urea is sprayed liquid elemental sulfur at a temperature of between 275 and 300 degrees Fahrenheit using a pressurized holding tank and a heated air atomizing nozzle. A spray rate of between 45 and 60 grams per minute is continued until the urea has been uniformly coated with about 13 percent sulfur. The resultant product is sulfur-coated urea.

Example 6

500 grams of granular urea is heated to 190 degrees Fahrenheit in an 18 inch diameter by 5 inch wide rotating stainless steel drum equipped with polycarbonate plow and inverse plow type mixing flights attached to a polycarbonate liner. To a 50 mL glass beaker is carefully weighed and then thoroughly mixed, 12 grams of diglycidal ether of "Bisphenol A" epoxy resin (Epotuf 37-139) and 8 grams of a polyamide curing agent (Versamid 140) sourced from Reichold Chemical and Henkel Chemical respectively. During moderate rotation of the coating drum or about 8 revolutions per minute, 5 grams of the pre-polymer mix is added uniformly across the mixing bed of urea where is gradually disperses and cures forming a hard continuous film on the urea particles. This process is repeated a second time thus forming a two layer epoxy coating on the urea.

Example 7

250 grams of the sulfur coated urea (SCU) from example 5 is preheated to 200 degrees Fahrenheit and placed in a preheated stainless drum that is 12 inches in diameter and 4 inches in width and equipped with 4 sets of mixing plows and inverse plows. While rotating the drum at 12 revolutions per minute 6 grams of the coating agent from example 1 is heated to 300 degrees F. and gradually streamed across the mixing bed of SCU. Mixing and heating (210 F) are maintained until the sealant coating is completely and uniformly dispersed along the surface area of the SCU thus forming an encapsulation coating. Heat is removed and the SCU product cooled after transferring to an air cooled vibrating chamber. The resultant product is a controlled release sulfur coated urea with an abrasion resistant nutrient bearing renewable resource sealant coating.

Example 8

250 grams of the epoxy coated urea (ECU) from example 6 is preheated to 210 degrees Fahrenheit and placed in a preheated stainless drum that is 12 inches in diameter and 4 inches in width and equipped with 4 sets of mixing plows and inverse plows. While rotating the drum at 12 revolutions per minute 4.5 grams of the coating agent from example 2 is heated to 300 degrees F. and gradually streamed across the mixing bed of ECU. Mixing and heating (210 F) are maintained until the sealant coating is completely and uniformly dispersed along the surface area of the ECU thus forming an encapsulation coating. Heat is removed and the ECU product cooled after transferring to an air cooled vibrating chamber. The resultant product is a controlled release epoxy coated urea fertilizer with an abrasion resistant nutrient bearing renewable resource sealant coating.

Example 9

460 grams of granular urea is heated to 120 degrees Fahrenheit in an 18 inch diameter by 5 inch wide rotating stainless steel drum equipped with 2 inch tall lifting flights positioned each 20 degrees of internal circumference. The drum is located within the confines of a fume hood. To the falling curtain of urea is sprayed 40 grams of the composition of example 4 preheated to 350 degrees F. using a heated pressure pot feeding an air atomized heated spray nozzle. All spraying equipment is temperature controlled using PID controllers, strategically located thermocouples and a combination of internal and external heaters. The composition of example 3 is sprayed at a rate of between 5 and 10 grams per minute thereby forming an approximately 8 percent encapsulation coating on the granular urea. The resultant product is a nutrient bearing, renewable resource, slow release fertilizer.

The invention claimed is:

1. A fertilizer composition comprising:
   a plant nutrient core containing at least one water soluble plant nutrient; and
   a biomaterial coating layer formed of a biomaterial produced by subjecting animal waste to a pyrolysis reaction, the biomaterial being a resinous thermoplastic substance liquefiable upon heating and the biomaterial imparting a slow release property to the fertilizer.

2. The fertilizer composition of claim 1, wherein said biomaterial coating layer is an encapsulating layer.

3. The fertilizer composition of claim 2, wherein said biomaterial is produced by subjecting said animal waste to a pressure of from 100 to 12,400 KPa and a temperature of from 100 to 500° C. in the absence of oxygen for a period of time no less than 5 minutes.

4. The fertilizer composition of claim 1, wherein said animal waste is sourced from manure.

5. The fertilizer composition of claim 4, wherein said manure is sourced from one or more members selected from the group consisting of swine manure, cow manure, horse manure, lamb manure, goat manure, chicken manure, and human manure.

6. The fertilizer composition of claim 1, including from 0.01 to 25% by weight of said biomaterial coating layer.

7. The fertilizer composition of claim 6, including from 1 to 10% by weight of said biomaterial coating layer.

8. The fertilizer composition of claim 1, wherein said biomaterial coating layer includes one or more members selected from the group consisting of polymers, compatibilizing agents, resins, extenders, odor modifiers, and fillers.

9. The fertilizer composition of claim 8, wherein said biomaterial coating layer includes from 1 to 99% by weight of said biomaterial and from 99 to 1% by weight of said polymers, compatibilizing agents, resins, extenders, modifiers, and fillers.

10. The fertilizer of claim 8 wherein the polymers include at least one member selected from the group consisting of polymers, copolymers or terpolymers selected from polyvinyl chloride, polyvinyl vinyl acetate, polyvinyl alcohol, copolymers of ethylene and vinyl acetate, copolymers of styrene and butadiene, copolymers of styrene and isoprene, terpolymers of ethylene, vinyl acetate and acrylic acid.

11. The fertilizer of claim 8 wherein the compatibilizing agent is selected from the group consisting of hydrocarbon chains containing at least one amine functionality, and hydrocarbon chains containing at least one carboxylic acid functionality.

12. The fertilizer composition of claim 1, wherein said core plant nutrient is selected from the group consisting of urea, ammonium sulfate, ammonium nitrate, ammonium sulfate-nitrate, calcium nitrate, calcium ammonium nitrate, ammonium phosphate, mono-ammonium phosphate, di-ammonium phosphate, triple super phosphate, and potassium compounds and mixtures thereof.

13. The fertilizer composition of claim 1, further comprising a fertilizer coating layer.

14. The fertilizer composition of claim 13 wherein said fertilizer coating layer is positioned between said biomaterial coating layer and said plant nutrient core component.

15. The fertilizer composition of claim 14, wherein said fertilizer coating layer is selected from the group consisting of polyurethanes, epoxies, polyacrylates, polyvinyldene chloride, sulfur, polyvinyl chlorides (PVC) and combinations thereof.

16. The composition of claim 13, including from 0.5 to 25% by weight of said fertilizer coating layer.

17. The fertilizer composition of claim 14, wherein said fertilizer coating layer is a sulfur coating.

18. The fertilizer composition of claim 14, wherein the fertilizer coating layer is a polyurethane coating.

19. The fertilizer composition of claim 14, wherein the fertilizer coating layer is an epoxy coating.

* * * * *